United States Patent [19]
Südholt et al.

[11] Patent Number: 5,546,916
[45] Date of Patent: Aug. 20, 1996

[54] METHOD AND APPARATUS FOR ADAPTING AIR VALUES FROM A PERFORMANCE GRAPH

[75] Inventors: Michael Südholt, Wolkering; Manfred Wier, Wenzenbach; Stephan Krebs, Regensburg; Bernhard Bauer, Rötz; Wolfgang Reupke, Regensburg, all of Germany

[73] Assignee: Siemens Aktiengesellschaft, Munich, Germany

[21] Appl. No.: 381,093

[22] Filed: Jan. 30, 1995

[63] Conitnuation of PCT/EP93/01766, filed Jul. 7, 1993.

[30] Foreign Application Priority Data

Jul. 28, 1992 [EP] European Pat. Off. ........... 92112871.6

[51] Int. Cl.$^6$ .................................................. F02D 41/00
[52] U.S. Cl. .............................................................. 123/674
[58] Field of Search ................................. 123/674, 673, 123/675, 677; 364/431.05, 431.06, 431.07

[56] References Cited

U.S. PATENT DOCUMENTS

| | | | |
|---|---|---|---|
| 4,933,863 | 6/1990 | Okano et al. | 364/431.07 |
| 4,945,883 | 8/1990 | Otto et al. | 123/494 |
| 4,999,781 | 3/1991 | Holl et al. | 364/431.05 |
| 5,001,643 | 3/1991 | Domino et al. | 364/431.06 |
| 5,053,968 | 10/1991 | Uchinami | 364/431.05 |
| 5,131,372 | 7/1992 | Nakaniwa | 123/673 |
| 5,158,062 | 10/1992 | Chen | 123/674 |
| 5,243,951 | 9/1993 | Nakaniwa | 123/674 |
| 5,404,861 | 4/1995 | Wild | 123/674 |

FOREIGN PATENT DOCUMENTS

| | | | |
|---|---|---|---|
| 0087809 | 9/1983 | European Pat. Off. | 123/674 |
| 0275507 | 7/1988 | European Pat. Off. | 123/674 |
| 4018776 | 12/1991 | Germany | 123/674 |
| 9102225 | 2/1991 | WIPO | 123/674 |

*Primary Examiner*—Raymond A. Nelli
*Attorney, Agent, or Firm*—Herbert L. Lerner; Laurence A. Greenberg

[57] ABSTRACT

A method and an apparatus are provided for adapting air values from a substitute performance graph to currently prevailing variables of state of ambient air. The air values are used for controlling mixture preparation if pulsations of air occur in an intake tube of an internal combustion engine instead of using measured values supplied by an air meter. The air values are adapted by multiplying the air values by an adaptation factor. In one embodiment the adaptation factor is calculated by dividing a measured value supplied by the air meter in the intake tube of the internal combustion engine by an air value taken from the substitute performance graph and subjecting the adaptation factor to sliding averaging, at times when no pulsations are present; and using a lambda-control-average value as the adaptation factor and subjecting the adaptation factor to sliding averaging, at times when pulsations are present. In another embodiment the adaptation factor is calculated by taking a substitute air value from the substitute performance graph, multiplying the substitute air value by a temperature value, multiplying a reciprocal value of the multiplication by a measured value supplied by the air meter in the intake tube, and subjecting the result to sliding averaging, at times when no pulsations are present; and using a lambda-control-average value as the adaptation factor and subjecting the adaptation factor to sliding averaging, at times when pulsations are present.

19 Claims, 2 Drawing Sheets

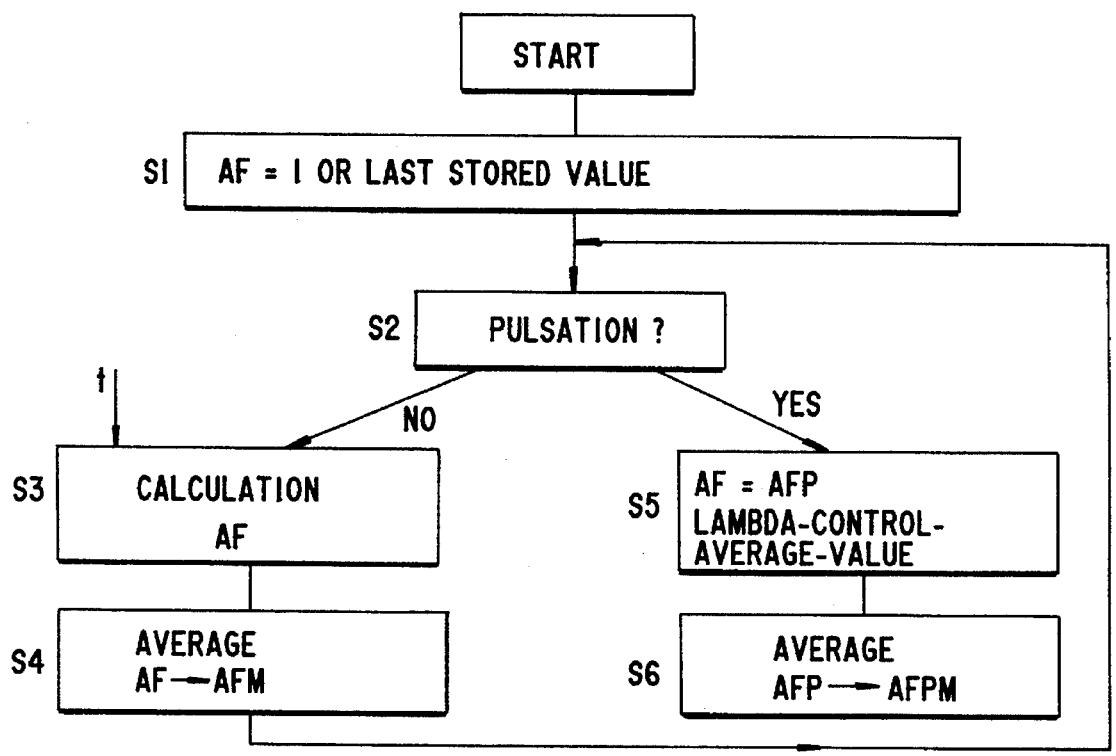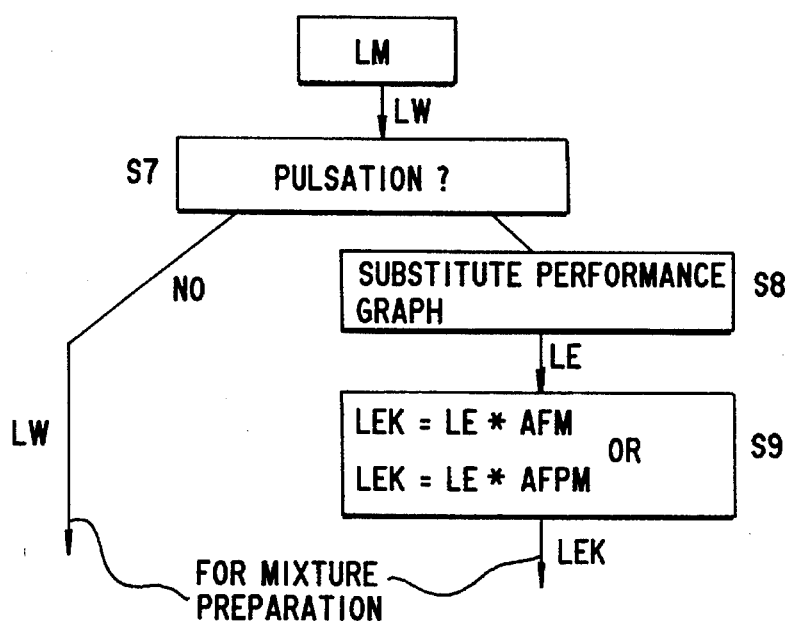

METHOD AND APPARATUS FOR ADAPTING AIR VALUES FROM A PERFORMANCE GRAPH

CROSS-REFERENCE TO RELATED APPLICATION

This application is a Continuation of International Application Serial No. PCT/EP93/01766, filed Jul. 7, 1993.

BACKGROUND OF THE INVENTION

1. Field of the Invention

The present invention relates to a method and an apparatus for adapting air values from a substitute performance graph, which is employed for controlling a mixture preparation during pulsations of air in an intake tube of an internal combustion engine, to currently prevailing state variables of the ambient air, such as temperature and pressure, for example.

Fuel measuring control systems require accurate information regarding an aspirated amount of air per stroke by the internal combustion engine for a correct mixture preparation. Such information is obtained through rapidly reacting air measuring devices which operate in accordance with the hot film principle. The output signal of the air meter follows each pulsation in the airflow in view of the high reaction speed.

Return flow air masses are also erroneously picked up. As soon as such pulsations occur, the air meter no longer provides correct measuring values which would be employable for the mixture preparation. If such pulsations are recognized, predetermined air values from a substitute performance graph are employed for the air mixture preparation, instead of the measuring values of the air meter. For example, such values are dependent on the load being stored, in particular the rotational speed and the throttle valve angle. The air values are established during normal temperature and normal pressure, tuned to the given type of engine, and stored in the substitute performance graph.

2. Summary of the Invention

It is accordingly an object of the invention to provide a method and an apparatus for adapting air values from a substitute performance graph, being employed for controlling a mixture preparation during pulsations of air in an intake tube of an internal combustion engine, to currently prevailing state variables of ambient air, which overcome the hereinafore-mentioned disadvantages of the heretofore-known methods and apparatus of this general type.

With the foregoing and other objects in view there is provided, in accordance with the invention, in a method for adapting air values from a substitute performance graph to currently prevailing variables of state of ambient air, the air values being used for controlling mixture preparation if pulsations of air occur in an intake tube of an internal combustion engine instead of using measured values supplied by an air meter, the improvement which comprises adapting the air values by multiplying the air values by an adaptation factor, and calculating the adaptation factor by dividing a measured value supplied by the air meter in the intake tube of the internal combustion engine by an air value taken from the substitute performance graph and subjecting the adaptation factor to sliding averaging, at times when no pulsations are present; and using a lambda-control-average value as the adaptation factor and subjecting the adaptation factor to sliding averaging, at times when pulsations are present.

With the objects of the invention in view, there is also provided, in a method for adapting air values from a substitute performance graph to currently prevailing variables of state of ambient air, the air values being used for controlling mixture preparation if pulsations of air occur in an intake tube of an internal combustion engine instead of using measured values supplied by an air meter, the improvement which comprises adapting the air values by multiplying the air values by an adaptation factor, and calculating the adaptation factor by taking a substitute air value from the substitute performance graph, multiplying the substitute air value by a temperature value, multiplying a reciprocal value of the multiplication by a measured value supplied by the air meter in the intake tube of the internal combustion engine to obtain a result, and subjecting the result to sliding averaging, at times when no pulsations are present; and using a lambda-control-average value as the adaptation factor and subjecting the adaptation factor to sliding averaging, at times when pulsations are present.

First of all, two operating ranges of the internal combustion engine are differentiated in the method according to the invention.

Outside of the Pulsation

The measuring value supplied by the air meter is employed for the mixture preparation. Simultaneously, in predetermined time intervals the air value measured by the air meter is compared with the associated air value from the substitute performance graph and an adaptation factor is calculated therefrom. Selectively, the measured temperature of the ambient air may be included in this calculation. Subsequently, the adaptation factor is subjected to a sliding averaging. If pulsations occur, the air values from the substitute performance graph and no longer the measuring values supplied by the air meter are employed for the mixture preparation. However, these values are first modified with the adaptation factor.

Within the Pulsation

The substitute air value from the substitute performance graph modified with the adaptation factor is employed for the mixture preparation, instead of the measuring value supplied by the air meter. Simultaneously, an adaptation factor is established within the pulsation. Since the air value from the air meter is not usable because of the pulsations, the lambda-control-mean value is employed instead. This value is subsequently subjected to a sliding averaging and represents the adoption factor.

In accordance with another mode of the invention, there is provided a method which comprises calculating the temperature factor by adding 273K to the measured ambient temperature to obtain a sum; multiplying the reciprocal of the sum by 293K to obtain a total; and taking a root from the total.

In accordance with a further mode of the invention, there is provided a method which comprises calculating no new adaptation factor if the internal combustion engine is in an operating range having an acceleration buildup, if the engine is in an operating range having a thrust reduction, if the engine is in an operating range having a run on, or if the engine is in an operating range in which the measured air value is smaller than a predetermined minimum value.

In accordance with an added mode of the invention, there is provided a method which comprises modifying the adaptation factor with a first load factor when the measured air value is smaller than a predetermined minimum value, and modifying the adaptation factor with a second load factor when the measured air value is at least as large as a predetermined minimum value.

In accordance with an additional mode of the invention, there is provided a method which comprises carrying out the sliding averaging of the adaptation factor according to a formula AFM $=AF_{(n-1)}*$ (1-MITKO)+$AF_{(n)}*$ MITKO, wherein AF is the adaptation factor, and MITKO is a selectable average constant having values between 0 and 1.

In accordance with a concomitant mode of the invention, there is provided a method which comprises setting the adaptation factor to 1 during a new start and setting the adaptation factor to the last determined and stored value of the last engine operation during each further start.

With the objects of the invention in view, there is additionally provided, in combination with an internal combustion engine, an air intake tube for supplying air to the engine, an air meter connected to the air intake tube for supplying measured values, and a substitute performance graph for supplying air values, an apparatus for adapting the air values to currently prevailing variables of state of ambient air, the air values being used for controlling mixture preparation if pulsations of air occur in the intake tube instead of using the measured values, comprising a processor unit being associated with the air meter and with the substitute performance graph and being programmed for performing the steps of the method.

Other features which are considered as characteristic for the invention are set forth in the appended claims.

Although the invention is illustrated and described herein as embodied in a method and an apparatus for adapting air values from a substitute performance graph, being employed for controlling a mixture preparation during pulsations of air in an intake tube of an internal combustion engine, to currently prevailing state variables of ambient air, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a flow chart which illustrates a calculation of an adaptation factor;

FIG. 2 is a flow chart for employing the adaptation factor; and

DESCRIPTION OF THE PREFERRED EMBODIMENTS

Figure 3:
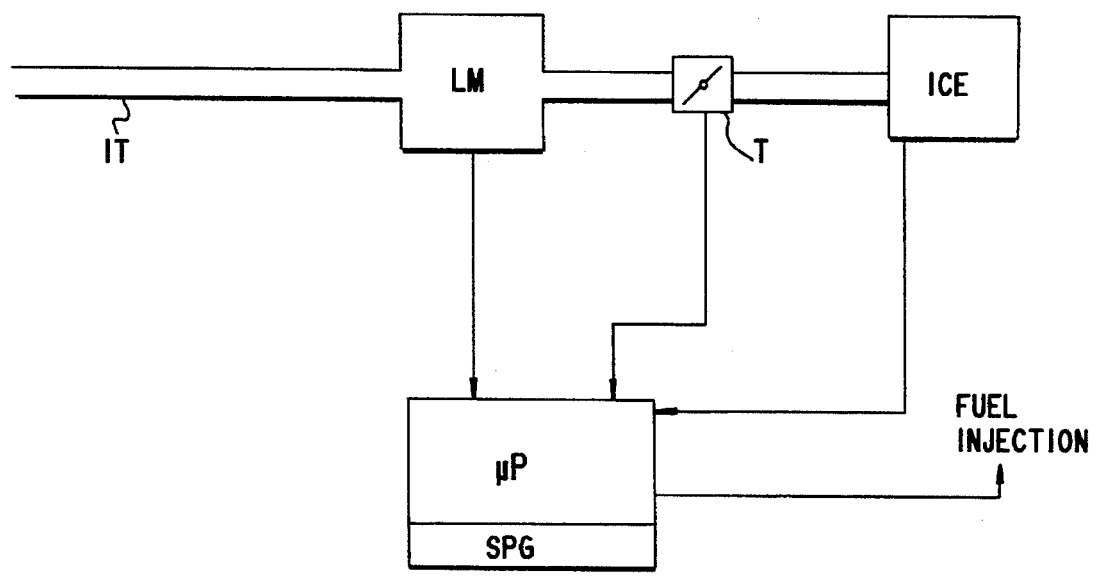
FIG. 3 is a diagrammatic view of a system for adapting air values from a substitute performance graph, which is employed for controlling a mixture preparation during pulsations of air in an intake tube of an internal combustion engine, to currently prevailing state variables of the ambient air.

Referring now to the figures of the drawing in detail and first, particularly, to FIG. 1 thereof, it is seen that an adaptation factor AF is set to 1 during a new start in a method step S1. With each further start the adaptation factor AF is set to the last established and stored value of the last engine operation. In a method step S2 it is established whether or not air pulsations are present in the intake tract of the internal combustion engine by means of any given known method for recognizing pulsations, which is not described in this case in any detail. If this is not the case, an adaptation factor AF is calculated in a method step S3. The currently prevailing state variables of the ambient air are taken into consideration when calculating the adaptation factor.

If only the pressure of the ambient air should be employed, the adaptation factor AF is calculated in accordance with the formula:

$$AFD = \frac{LW}{LE * TF}$$

wherein reference symbol LW denotes the air value measured by an air meter in the intake tract of the internal combustion engine. Reference symbol LE represents an air value from the substitute performance graph corresponding to the actual operating dimensions of the internal combustion engine.

Reference symbol TF is a temperature factor, i.e. a factor depending on the measured ambient temperature of the air. This factor is calculated, for example, in accordance with the formula:

$$TF = \sqrt{\frac{293\ K}{t + 273\ K}}$$

wherein t is the measured outer temperature of the air in °C.

If the temperature of the ambient air should be employed in addition to pressure, the adaptation factor AF is calculated in accordance with formula:

$$AFDT = \frac{LW}{LE},$$

wherein LW and LE are the already afore-described values.

In a method step S4 the adaptation factor established in accordance with one of the aforementioned formulas is subjected to a sliding mean, for example, in accordance with formula:

$$AFM = AF_{n-1} * (1-MITKO) + AF_n * MITKO$$

wherein reference symbol AFM generally denotes the established adaptation factor and reference symbol AF generally denotes the established adaptation factor in accordance with one of the aforementioned formulas. Reference symbol MITKO represents a selectable mean constant having values which are between 0 and 1.

In order to establish the next adaptation factor, one would return again to the method step S2.

If it is established that pulsations of air are present in the intake tract in the method step S2, then the mean value of the lambda control (AF=AFP) is employed in a method step S5. It is then also subjected to a sliding mean in a method step S6. In order to establish the next adaptation factor one again has to return to the method step S2.

FIG. 2 illustrates which air value is employed for the mixture preparation during the operation of the internal combustion engine. Thus, by means of a method which is not described in detail herein, a test is performed in a method step S7 as to whether or not pulsations of the air are present in the intake tract of the internal combustion engine. If this is not the case, the air value LW measured directly from an air mass meter LM is employed for controlling the mixture preparation.

If pulsations are determined, a substitute air value LE is taken from a substitute performance graph in dependency on the actual operating conditions of the internal combustion engine in a method step S8.

This substitute air value is modified with the previously calculated adaptation value (LEK) in a method step S9. This modified substitute air value LEK is then employed for controlling the mixture preparation.

FIG. 3 shows an air intake tube IT connected to an internal combustion engine ICE. An air flow rate meter LM for supplying the measured values LW and a throttle T are connected in the air intake tube IT. A processor µP is associated with the air mass flow rate meter LM, with the throttle T and with the engine ICE for sending signals to a fuel injector. A substitute performance graph or memory SPG for supplying the air values LE is associated with the processor µP.

We claim:

1. A method for controlling mixture preparation in an intake tube of an internal combustion engine, which comprises the steps of:
   1. measuring air values in an intake tube of an internal combustion engine with an air mass meter;
   2. adapting the air values by multiplying the air values by an adaptation factor, and calculating the adaptation factor by:
      a. dividing a measured value supplied by the air meter in the intake tube of the internal combustion engine by an air value taken from a substitute performance graph and subjecting the adaptation factor to sliding averaging, at times when no pulsations are present; and
      b. using a lambda-control-average value as the adaptation factor and subjecting the adaptation factor to sliding averaging, at times when pulsations are present; and
   3. controlling mixture preparation in the intake tube of the internal combustion engine by employing adapted air values as a signal to a fuel injector.

2. A method for controlling mixture preparation in an intake tube of an internal combustion engine, which comprises the steps of:
   1. measuring air values in an intake tube of an internal combustion engine with an air mass meter;
   2. adapting the air values by multiplying the air values by an adaptation factor, and calculating the adaptation factor by:
      a. taking a substitute air value from a substitute performance graph, multiplying the substitute air value by a temperature value, multiplying a reciprocal value of the multiplication by a measured value supplied by the air meter in the intake tube of the internal combustion engine to obtain a result, and subjecting the result to sliding averaging, at times when no pulsations are present; and
      b. using a lambda-control-average value as the adaptation factor and subjecting the adaptation factor to sliding averaging, at times when pulsations are present; and
   3. controlling mixture preparation in the intake tube of the internal combustion engine by employing adapted air values as a signal to a fuel injector.

3. The method according to claim 2, which comprises calculating the temperature factor by:
   adding 273K to the measured ambient temperature to obtain a sum;
   multiplying the reciprocal of the sum by 293K to obtain a total; and
   taking a root from the total.

4. The method according to claim 1, which comprises calculating no new adaptation factor if the internal combustion engine is in an operating range having an acceleration buildup.

5. The method according to claim 1, which comprises calculating no new adaptation factor if the internal combustion engine is in an operating range having a thrust reduction.

6. The method according to claim 1, which comprises calculating no new adaptation factor if the internal combustion engine is in an operating range having a run on.

7. The method according to claim 1, which comprises calculating no new adaptation factor if the internal combustion engine is in an operating range in which the measured air value is smaller than a predetermined minimum value.

8. The method according to claim 2, which comprises calculating no new adaptation factor if the internal combustion engine is in an operating range having an acceleration buildup.

9. The method according to claim 2, which comprises calculating no new adaptation factor if the internal combustion engine is in an operating range having a thrust reduction.

10. The method according to claim 2, which comprises calculating no new adaptation factor if the internal combustion engine is in an operating range having a run on.

11. The method according to claim 2, which comprises calculating no new adaptation factor if the internal combustion engine is in an operating range in which the measured air value is smaller than a predetermined minimum value.

12. The method according to claim 1, which comprises modifying the adaptation factor with a first load factor when the measured air value is smaller than a predetermined minimum value, and modifying the adaptation factor with a second load factor when the measured air value is at least as large as a predetermined minimum value.

13. The method according to claim 2, which comprises modifying the adaptation factor with a first load factor when the measured air value is smaller than a predetermined minimum value, and modifying the adaptation factor with a second load factor when the measured air value is at least as large as a predetermined minimum value.

14. The method according to claim 1, which comprises carrying out the sliding averaging of the adaptation factor according to a formula $AFM = AF_{(n-1)} * (1-MITKO) + AF_{(n)} * MITKO$, wherein AF is the adaptation factor, and MITKO is a selectable average constant having values between 0 and 1.

15. The method according to claim 2, which comprises carrying out the sliding averaging of the adaptation factor according to a formula $AFM = AF_{(n-1)} * (1-MITKO) + AF_{(n)} * MITKO$, wherein AF is the adaptation factor, and MITKO is a selectable average constant having values between 0 and 1.

16. The method according to claim 1, which comprises setting the adaptation factor to 1 during a new start and setting the adaptation factor to the last determined and stored value of the last engine operation during each further start.

17. The method according to claim 2, which comprises setting the adaptation factor to 1 during a new start and setting the adaptation factor to the last determined and stored value of the last engine operation during each further start.

18. An apparatus for adapting air values to currently prevailing variables of state of ambient air for controlling mixture preparation in an intake tube of an internal combustion engine having an air meter connected to the air intake tube for supplying measured values, a substitute performance graph for supplying the air values, and a fuel injector for supplying fuel to the engine, the apparatus comprising:

a processor unit being associated with an air meter, with a substitute performance graph and with a fuel injector and being programmed for:

1. adapting air values by multiplying the air values by an adaptation factor, and calculating the adaptation factor by:

dividing a measured value supplied by the air meter in an intake tube of an internal combustion engine by an air value taken from the substitute performance graph and subjecting the adaptation factor to sliding averaging, at times when no pulsations are present; and using a lambda-control-average value as the adaptation factor and subjecting the adaptation factor to sliding averaging, at times when pulsations are present; and 2. controlling mixture preparation in the intake tube of the internal combustion engine by employing adapted air values as a signal to the fuel injector.

19. An apparatus for adapting air values to currently prevailing variables of state of ambient air for controlling mixture preparation in an intake tube of an internal combustion engine having an air meter connected to the air intake tube for supplying measured values, a substitute performance graph for supplying the air values, and a fuel injector for supplying fuel to the engine, the apparatus comprising:

a processor unit being associated with an air meter, with a substitute performance graph and with a fuel injector and being programmed for:

1. adapting air values by multiplying the air values by an adaptation factor, and calculating the adaptation factor by:

taking a substitute air value from the substitute performance graph, multiplying the substitute air value by a temperature value, multiplying a reciprocal value of the multiplication by a measured value supplied by the air meter in an intake tube of an internal combustion engine to obtain a result, and subjecting the result to sliding averaging, at times when no pulsations are present; and using a lambda-control-average value as the adaptation factor and subjecting the adaptation factor to sliding averaging, at times when pulsations are present; and 2. controlling mixture preparation in the intake tube of the internal combustion engine by employing adapted air values as a signal to the fuel injector.

* * * * *

UNITED STATES PATENT AND TRADEMARK OFFICE
CERTIFICATE OF CORRECTION

PATENT NO.    : 5,546,916
DATED         : August 20, 1996
INVENTOR(S)   : Suedholt et al.

Page 1 of 1

It is certified that error appears in the above-identified patent and that said Letters Patent is hereby corrected as shown below:

<u>Title page,</u>
Item [54], and column 2, lines 1-3, change "Method and Apparatus for adapting air values from a performance graph" to
-- Method and Apparatus for adapting air values from a substitute performance graph being employed for controlling a mixture preparation during pulsations of air in an intake pipe of an internal combustion engine to currently prevailing state variables of ambient --.

Signed and Sealed this

Fifth Day of February, 2002

Attest:

JAMES E. ROGAN
*Director of the United States Patent and Trademark Office*

*Attesting Officer*